United States Patent Office.

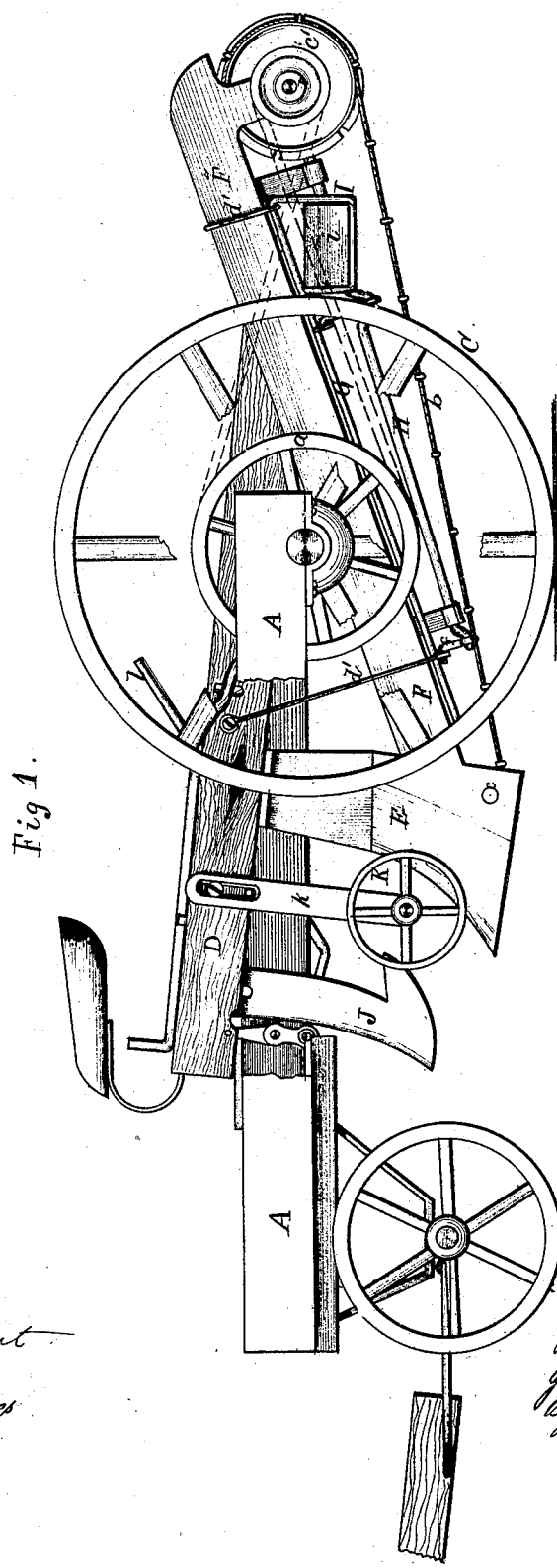

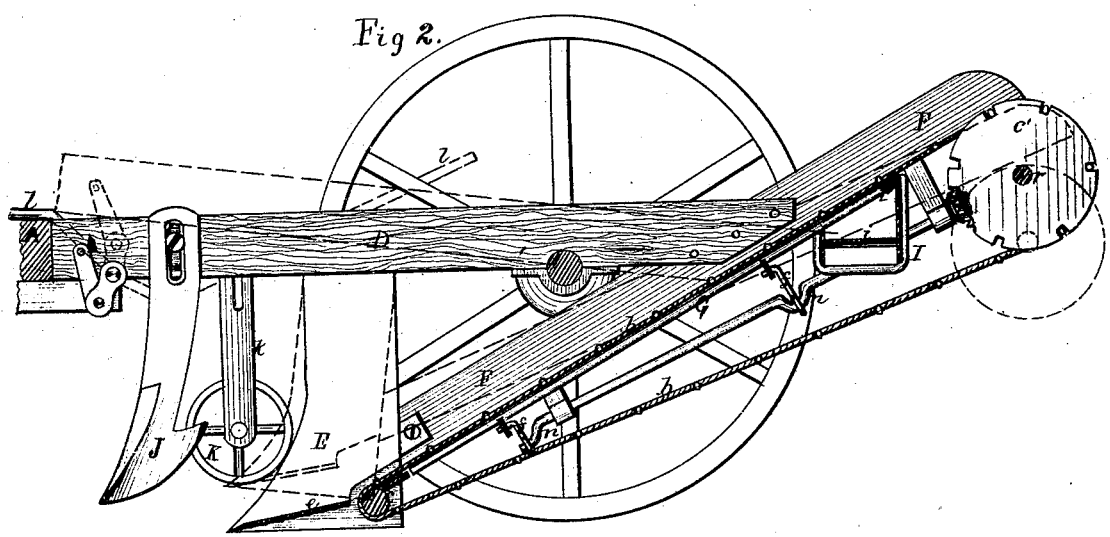
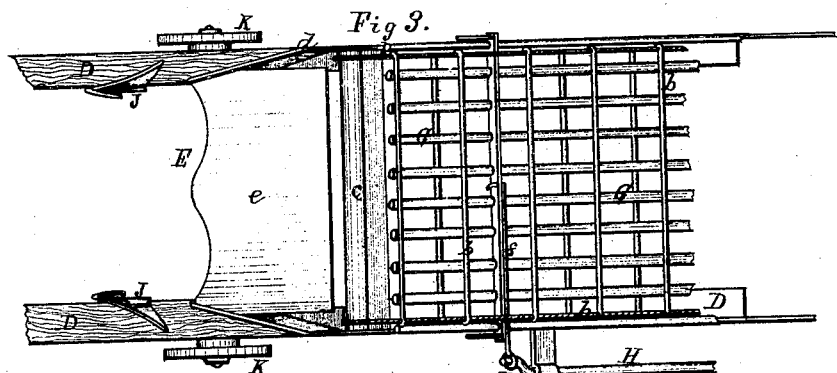
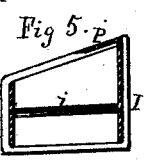

G. W. ADAMS AND JOHN R. HOPPER, OF ROCHESTER, NEW YORK.

Letters Patent No. 94,693, dated September 14, 1869.

IMPROVEMENT IN POTATO-DIGGERS.

The Schedule referred to in these Letters Patent and making part of the same.

*To all whom it may concern:*

Be it known that we, G. W. ADAMS and JOHN R. HOPPER, of Rochester, in the county of Monroe, and State of New York, have invented certain new and useful Improvements in Potato-Diggers; and we do hereby declare that the following is a full, clear, and exact description thereof, reference being had to the accompanying drawings, making part of this specification, in which—

Figure 1 is a side elevation of our invention, with portions broken away;

Figure 2 is a vertical longitudinal section, showing parts in elevation;

Figure 3 is an inverted view of the shovel and contiguous parts;

Figure 4 is a longitudinal section of the discharge-spout I; and

Figure 5 is a transverse section of the same.

Our invention consists chiefly in improvements upon a device patented by JOHN R. HOPPER, March 30, 1869, and to enable others to understand the same we will describe its construction and operation.

The main frame A, fig. 1, we support upon truck-wheels in front and driving-wheels, C, in the rear, the side-bars of said frame being located outside the wheels, as shown.

Within the frame A we use the auxiliary frame D, resting upon the driving-axle and supporting the shovel E, and endless apron-frame, F.

The frame D and its incumbent parts are thus capable of being swung about the main axle by lever *l* and its connections, which raise and lower the shovel, as indicated by dotted lines in fig. 2.

In front of the shovel E we use the plows J, figs. 1, 2, and 3, the cutting edges of which are rounded to prevent the vines from clinging to them.

These plows are adjustable vertically upon the frame D, and are set slightly within the cutting-line of the shovel, as seen in fig. 3; they cut away the side of the hill, leaving only the central portion to be taken up by the shovel, and also divide the vines between the rows, thereby clearing the track for the shank of the shovel.

Between the shovel and the plows we provide gauge-wheels K, revolving on studs fixed to the lower end of the vertically-adjustable bars *k*.

These wheels follow the surface which has been levelled by the plows, and govern the depth of cut of the shovel, relieving the operator from the necessity of controlling it by the lever *l*.

The shovel E consists of a bottom *e*, figs. 2 and 3, and side-plates or shanks *d*, the latter being bent obliquely outward for a short distance from the cutting-edge, as shown in fig. 3, for the purpose of increasing the width of the endless apron *b* and riddle G, whereby the contents of the hill receive a more thorough screening.

The endless-apron *b*, figs. 1, 2, and 3, made with cross-slats secured to side chains or ropes, in the usual manner, runs over a roller, *c*, at the lower end of the frame F, and pulleys *c'* at its upper end, which pulleys are secured to the shaft *r*, "boxed" upon said frame, and driven from the pulley *a*, upon the main axle, by a crossed belt, shown in dotted lines in fig. 1.

This apron carries the earth, together with the vines and potatoes, from the shovel over the inclined riddle G.

Riddle G is suspended upon frames F and D, immediately under the upper half of the endless apron *b*, by links *d'*, fig. 1, and receives a vibrating motion transversely to the motion of the apron, from cranks upon the shaft H, which shaft runs in boxes secured to frame F, and is driven by bevel-gears from shaft *r*. Rods *f*, figs. 1, 2, and 3, connect these cranks to cross-bars upon the riddle.

Immediately at the upper end of the riddle the spout I is provided, to receive and discharge the potatoes as they are drawn up by the endless apron, which spout partakes of the motion of the riddle, and has a tilting bottom, *i*, fig. 4, pivoted at its centre longitudinally.

The object of this arrangement is to drop the potatoes always upon the "worked" side of the field, whereby it is not necessary to move them upon the return of the machine in the next row.

The cutter *p*, figs. 2 and 5, secured to the rear edge of the spout I, and partaking of its vibratory motion, severs the potatoes that might cling to the vines, and also cuts away any vines or weeds that may adhere to the bars of the apron.

The operation of our invention is as follows:

The plows J having separated the vines and cut away the side of the hill, the shovel E, adjusted to a suitable depth, excavates the remainder of the hill, and forces it upon the endless apron *b*, by which it is drawn upon the riddle G.

The transverse vibrations of the riddle for its whole length thoroughly screen out the dirt, leaving the potatoes upon the bars of the riddle and vines upon the apron.

As fast as the potatoes arrive at the extremity of the riddle they fall into the spout I, and are discharged upon the ground at the side of the machine, while the vines are carried up and dropped at the rear.

It is plain that the frame D and its connections are easily shifted vertically, since the weight of the frame F at the rear of the axle tends to balance the weight of the shovel and contiguous parts.

There is also an evident advantage in vibrating the riddle bodily instead of pivoting it at one end, and also in making the discharge-spout a part of said riddle.

The plows J materially assist the shovel in performing its work, and the peculiar form of the shovel-shanks $d$ increases its efficiency as well as that of the screening-apparatus.

What we claim as our invention, and desire to secure by Letters Patent, is—

1. The laterally tilting bottom $i$, of the box I, whereby the potatoes may be delivered upon either side of the machine, as set forth.

2. The adjustable dividing-plows J, in combination with the shovel E and frame D.

3. The adjustable gauge-wheels K, in combination with the auxiliary frame D and shovel E, for the purposes specified.

4. The obliquely bent sides $d$ of the shovel E, as and for the purpose set forth.

5. The riddle G, provided with the discharge-spout I, and having a parallel lateral shake, for the purposes set forth.

6. In combination with the revolving endless apron $b$, the vibrating cutter $p$, for the purposes set forth.

G. W. ADAMS.
JOHN R. HOPPER.

Witnesses:
A. H. BILLINGS,
WM. S. LOUGHBOROUGH.